(12) United States Patent
Ehara

(10) Patent No.: US 9,203,776 B2
(45) Date of Patent: Dec. 1, 2015

(54) NETWORK SYSTEM, CONTROLLER AND QOS CONTROL METHOD

(75) Inventor: Koji Ehara, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 13/980,298

(22) PCT Filed: Dec. 5, 2011

(86) PCT No.: PCT/JP2011/078066
§ 371 (c)(1),
(2), (4) Date: Oct. 3, 2013

(87) PCT Pub. No.: WO2012/098774
PCT Pub. Date: Jul. 26, 2012

(65) Prior Publication Data
US 2014/0036673 A1   Feb. 6, 2014

(30) Foreign Application Priority Data

Jan. 20, 2011   (JP) ................................. 2011-009720

(51) Int. Cl.
| | | |
|---|---|---|
| H04L 12/28 | (2006.01) | |
| H04L 12/927 | (2013.01) | |
| H04L 12/725 | (2013.01) | |
| H04L 12/717 | (2013.01) | |

(52) U.S. Cl.
CPC ............ *H04L 47/805* (2013.01); *H04L 45/302* (2013.01); *H04L 45/42* (2013.01)

(58) Field of Classification Search
CPC ..... H04L 12/54; H04L 12/56; H04L 12/5693; H04L 12/5695
USPC .......................... 370/389, 395.2, 395.31, 422
See application file for complete search history.

(56) References Cited

U.S. PATENT DOCUMENTS

| | | | |
|---|---|---|---|
| 8,503,307 B2* | 8/2013 | Tourrilhes et al. ............ | 370/237 |
| 8,537,846 B2* | 9/2013 | Sharma et al. ................ | 370/412 |

(Continued)

FOREIGN PATENT DOCUMENTS

| | | |
|---|---|---|
| CN | 1372416 A | 10/2002 |
| CN | 1783866 A | 6/2006 |

(Continued)

OTHER PUBLICATIONS

Casado, Rethinking Enterprise Network Control, IEEE, Aug. 2009, pp. 1270-1283.*
International Search Report in PCT/JP2011/078066, dated Jan. 24, 2012 (English Translation Thereof).

(Continued)

*Primary Examiner* — Dmitry H Levitan
(74) *Attorney, Agent, or Firm* — McGinn IP Law Group, PLLC

(57) ABSTRACT

When a network composed of usual switches on a communication route exists, in the network, a QoS control cannot be carried out to a user. Specifically, the switch receives a packet and issues a notice to an external controller and a user authenticating section of the controller determines a QoS policy of a flow. When a plurality of networks exists on the route, a route calculating section selects a route based on the QoS policy and topology data so as to pass through an appropriate network. A flow table generating section generates a flow table which carries out queuing based on the QoS policy and a marking of a DSCP value to a DS field of a header when transmitting a packet to the selected network, and registers the flow table for the round-trip on the switch.

10 Claims, 8 Drawing Sheets

(56) References Cited

U.S. PATENT DOCUMENTS

| | | | |
|---|---|---|---|
| 8,670,310 B2* | 3/2014 | Sharma et al. | 370/230 |
| 2008/0049648 A1 | 2/2008 | Liu et al. | |
| 2011/0317559 A1* | 12/2011 | Kern et al. | 370/235 |

FOREIGN PATENT DOCUMENTS

| | | |
|---|---|---|
| CN | 1812365 A | 8/2006 |
| CN | 1859250 A | 11/2006 |
| CN | 101442428 A | 5/2009 |
| EP | 1 976 184 A1 | 10/2008 |
| JP | 3750634 B | 3/2006 |
| JP | 2008-278006 A | 11/2008 |

OTHER PUBLICATIONS

"OpenFlow Switch Specification, Version 1.0.0",[online] Dec. 31, 2009, the Internet (URL:http://www.openflowswitch.org/documents/openflow-spec-v1.0.0.pdf).

S. Blake et al. "An Architecture for Differentiated Services" (http://www.ietf.org/rfc/rfc2475.txt) The Internet society (1998).

Yuetsu Kodama, Fumihiro Okazaki, Ryosei Takano, Tomohiro Kudo, "Dynamic Network Selection Mechanism based on Traffic Characteristic", IEICE Technical Report, vol. 110, No. 190, Aug. 26, 2010, pp. 31 to 36.

English translation of PCT/ISA/237 (written opinion of the international searching authority, dated Jan. 24, 2012).

PCT/IB/373 dated Jul. 23, 2013.

Chinese Office Action dated Jun. 2, 2015 with an English translation thereof.

* cited by examiner

Fig. 2

| USER NAME | PASSWORD | QOS POLICY |
|---|---|---|
| user1 | ****** | AF11 |
| user2 | ****** | AF21 |
| user3 | ****** | AF31 |
| user4 | ****** | AF41 |
| ⋮ | ⋮ | ⋮ |

Fig. 3

| IP ADDRESS | QOS POLICY |
|---|---|
| 192.168.1.1 | AF11 |
| 192.168.2.1 | AF21 |
| 192.168.3.1 | AF31 |
| 192.168.4.1 | AF41 |
| ⋮ | ⋮ |

Fig. 4

| SWITCH NAME | PORT NAME | NETWORK NAME | BAND WIDTH |
|---|---|---|---|
| switch 1 | 0/1 | NETWORK A | 1Gdps |
| switch 2 | 0/1 | NETWORK A | 1Gdps |
| switch 1 | 0/2 | NETWORK B | 100Mps |
| switch 2 | 0/2 | NETWORK B | 100Mps |
| ⋮ | ⋮ | ⋮ | ⋮ |
| | | | |

Fig. 5

| SWITCH NAME | SOURCE IP ADDRESS | DESTINATION IP ADDRESS | PROTOCOL | SOURCE TCP/UDP PORT NO. | DESTINATION TCP/UDP PORT NO. | DSCP VALUE | TRANSMISSION PORT | TRANSMISSION QUEUE | DSCP VALUE |
|---|---|---|---|---|---|---|---|---|---|
| switch 1 | 192.168.1.1 | 192.168.10.1 | TCP | * | 80 | * | 0/1 | 1 | AF11 |
| switch 2 | 192.168.1.1 | 192.168.10.1 | * | * | * | AF11 | 0/3 | 1 | − |
| switch 2 | 192.168.10.1 | 192.168.1.1 | TCP | 80 | * | * | 0/1 | 1 | AF11 |
| switch 1 | 192.168.10.1 | 192.168.1.1 | * | * | * | AF11 | 0/3 | 1 | − |
| ... | ... | ... | ... | ... | ... | ... | ... | ... | ... |

MATCHING CONDITION (RULE) / ACTION

NETWORK SYSTEM, CONTROLLER AND QOS CONTROL METHOD

TECHNICAL FIELD

The present invention relates to a network system, especially to a QoS control method through user authentication in a computer network.

BACKGROUND ART

In recent years, a QoS (Quality of Service) control can be carried out in an application unit or a user unit in a computer network.

This is realized by identifying an application and a user under the condition of flow data of an application communication (a set of a source IP address, a destination IP address, a protocol, a source port number, a destination port number) and executing processing of a packet primarily in a router and a switch which exist on the communication path.

In such a conventional computer network, because the flow data which contains the IP address for identifying a user is statically set to the router and the switch, there is a problems that the QoS control cannot be carried out in the communication in a user unit when the IP address of the user is changed dynamically in case of a mobile terminal.

As for this problem, Patent Literature 1 (Japanese Patent No. 3,750,634) discloses the QoS control method in a user unit, in which an IP address and a user are related to each other through the user authentication, and the QoS policy is set dynamically according to the allocated QoS data, (reference to paragraphs [0039] to [0060] and FIG. 3 of Patent Literature 1).

However, in Patent Literature 1, there was a problem that the switches on the communication route must have a function of authentication QoS. When there is a network which is composed of usual switches on the communication route, the QoS control to the user cannot be carried out in the network.

CITATION LIST

[Patent literature 1] Japanese Patent No. 3,750,634

Non-Patent Literature

[Non-patent literature 1] OpenFlow Switch Specification, Version 1.0.0
[Non-patent literature 2] An Architecture for Differentiated Services

SUMMARY OF THE INVENTION

When the QoS control should be realized through the user authentication in the conventional computer network, there is a problem that the switches on the communication route must all have authentication QoS functions. When there is a network which is composed of usual switches on the communication path, in the network, the QoS control to the user cannot be carried out.

An object of the present invention is to provide a network system and a QoS control method which solves the above-mentioned problem.

The network system according to the present invention includes a switch connected with a plurality of external networks and having a function of executing processing of a reception packet according to an entry of a preregistered flow table; and a controller having a function of registering an entry defined with a rule and an action to uniformly control packets of a flow by the switch, on a flow table of the switch. The controller classifies flows into classes. When receiving the inquiry of the packet from the switch, the controller carries out user authentication to the transmission source of the packet based on the packet, and determines the QoS class based on a result of the user authentication. The controller has a function of determining the communication route so as to pass through the external network corresponding to the QoS class based on the connection status of the network and of the authenticated transmission source based on the band width.

The controller according to the present invention includes a user authenticating section configured to carry out user authentication to a transmission source of a packet based on the packet in case that an inquiry of the packet is received from a switch which executes processing of a reception packet according to an entry of a flow table preregistered, of switches connected with a plurality of external networks, a QoS control section configured to determine a QoS class based on a result of the user authentication, a route calculating section configured to determine a communication route so as to pass through an external network corresponding to the QoS class based on a connection state of a network and the authenticated transmission source and a band width, and a switch control section configured to register an entry defined with a rule and an action to uniformly control packets of a flow by the switch to the flow table of the switch based on the QoS policy.

In a QoS control method according to the present invention, user authentication is carried out to a transmission source of a packet based on the packet In case that an inquiry of the packet is received from a switch which executes processing of a reception packet according to an entry of a preregistered flow table, of switches connected with a plurality of external networks, in a controller. Also, a QoS class is determined based on a result of the user authentication. Also, a communication route is determined so as to pass through an external network corresponding to the QoS class of a transmission source based on an authenticated connection status of a network and a band width. Also, an entry defined with a rule and an action to uniformly control packets of a flow by the switch is registered to the flow table of the switch based on the determined communication route.

A program according to the present invention is a program to make a computer to execute: carrying out user authentication to a transmission source of a packet based on the packet In case that an inquiry of the packet is received from a switch which executes processing of a reception packet according to an entry of the preregistered flow table, of switches connected with a plurality of external networks; determining a QoS class based on a result of the user authentication; determining a communication route so as to pass through an external network corresponding to the QoS class of the authenticated transmission source based on a connection status of a network and a band width; registering an entry defined with a rule and an action to uniformly control packets of a flow by the switch, to the flow table of the switch based on a QoS policy.

The program according to the present invention is the program to make the computer execute the processing of the above-mentioned QoS control method. It should be noted that the program according to the present invention can be stored in a storage and a storage medium.

Thus, when a plurality of external networks exist on the communication route, the QoS control can be carried out in a user unit.

BRIEF DESCRIPTION OF THE DRAWINGS

FIG. 2 is a diagram showing an example of user data stored in a user data storage section;

FIG. 3 is a diagram showing an example of a QoS policy correspondence table stored in a QoS policy storage section;

FIG. 4 is a diagram showing an example of topology data stored in a topology data storage section;

FIG. 5 is a diagram showing an example of a flow table stored in a flow table storage section;

DESCRIPTION OF EXEMPLARY EMBODIMENTS (Premise)

Figure 1:
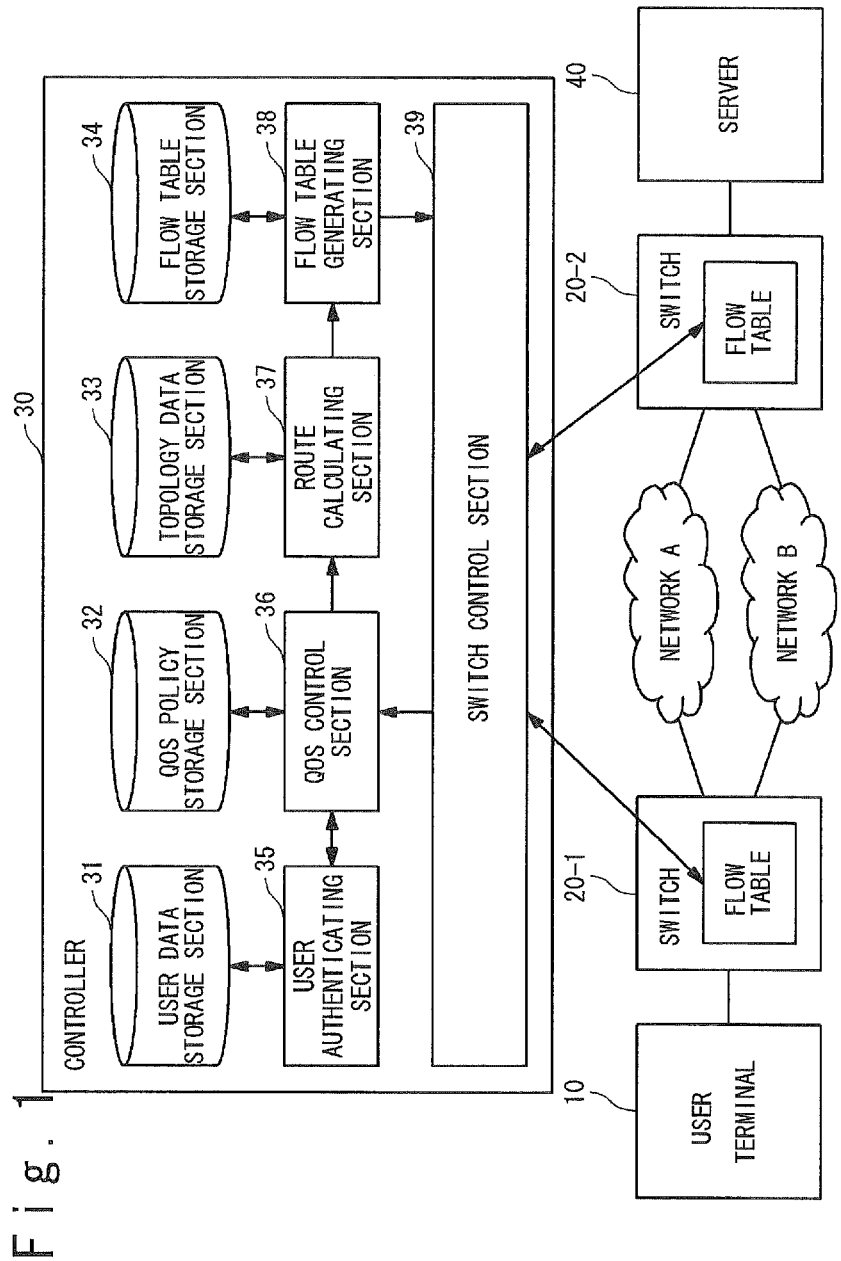
FIG. 1 is a diagram showing a configuration example of a network system according to a first exemplary embodiment of the present invention.

In a target of a network system according to the present invention, a target is a CU (C: control plane and U: user plane) separation type network in which a switch and a terminal and so on (user plane) are controlled by an external the controller (control plane). As an example of the CU separation type network, an open flow network is exemplified which uses the open flow (OpenFlow) technique and which controls the switch from the controller to carry out a route control in the network. It should be noted that the open flow network is only an example.

(Description of Open Flow Network)

In the open flow network, a controller such as an OFC (OpenFlow controller) controls the operation of a switch by manipulating a flow table in the switch such as an OFS (OpenFlow switch). The controller and the switch are connected with a secure channel for the controller to control a switch by using a control message based on an open flow protocol.

The switches in the open flow network form an open flow network and are edge switches and core switches under the control of the controller. A series of packets which flow through a same route from the reception of the packets in the edge switch on the input side to the transmission of the packets in the edge switch on the output side in the open flow network are called a flow. The packet may be read as a frame.

The flow table is a table which a flow entry defining predetermined processing (action) to be carried out to a packet (communication data) which matches a preset match condition (a rule) is registered on.

The rule of the flow entry is defined based on each of a destination address, a source address, a destination port, and a source port, which are contained in a header field of each protocol hierarchy of the packet, or various combinations of them and can be identified. It should be noted that the above-mentioned addresses contain MAC (Media Access Control) addresses and IP (Internet Protocol) addresses. Also, in addition to the above data, the data of an ingress port can be used as the rule of the flow entry.

The action of the flow entry shows an operation such as "output to a specific port", "discard", and "rewrite a header". For example, the switch outputs a packet to an output port corresponding to the action if identification data (the output port number and so on) of the output port is shown in the action of the flow entry, and discards the packet if the identification data of the output port is not shown. Or, if header data is shown in the action of the flow entry, the switch rewrites the header of the packet based on the header data.

The switch in the open flow network executes the action of the flow entry to a packet group (a packet series) which conforms with the rule of the flow entry.

The details of the open flow technique are described in Non-Patent Literature 1.

It should be noted that there is a plurality of transmission queues in a transmission port of the switch. In the transmission port of the switch, the behaviors such as the minimum rate, the maximum rate, and the priority in case of the transfer are determined based on a type of the queue and are used for QoS control.

Also, a match condition to be compared with the header data of the packet (source IP address, destination IP address, protocol, TCP/UDP source port number, TCP/UDP destination port number) is defined in the flow entry of the flow table. The header data is used to determine the transmission port and the transmission queue as the action when the packet matches the match condition.

Also, as a method of controlling QoS by classifying flows into classes, and assigning priorities, "DiffServ" (Differentiated Services) described in Non-Patent Literature 2 is well-known.

First Exemplary Embodiment

Below, a first exemplary embodiment of the present invention will be described with reference to the attached drawings.

(Configuration)

As shown in FIG. 1, a network system according to the present invention contains a user terminal 10, switches 20 (20-$i$, $i=1$ to n), a controller 30 and a server 40.

The user terminal 10 is an input/output processor used by a user, and generates and transmits a packet to the server 40.

Each of the switches 20 (20-$i$, $i=1$ to n) transfers a received packet based on a flow entry registered on its own flow table. Each of the switches 20 (20-$i$, $i=1$ to n) is connected through the network. In this case, when there is no flow entry corresponding to the received packet, the switch 20 notifies a reception packet to the controller 30 as a first packet (unregistered new packet), and requests entry registration to the reception packet.

Here, a plurality of external networks of an external network A and an external network B exist between the switch 20-1 and the switch 20-2.

The controller 30 calculates a route in response to the reception notice of the first packet from either of the switches 20 (20-$i$, $i=1$ to n) and registers a flow entry in the flow tables of the switches related to the route.

The server 40 is a server which provides a service to the user terminal 10 through the network and receives the packet.

(Exemplification in Hardware)

As an example of the user terminal 10, the controller 30 and the server 40, computers such as a PC (personal computer), an appliance, a thin client terminal/server, a workstation, a mainframe, a supercomputer are assumed. Also, the user terminal 10, the controller 30 or the server 40 may be an expansion board which is mounted on the computer and a virtual machine (VM) built on a physical machine.

It should be noted that the user terminal 10 may be a portable phone, a smart phone, a smart book, a car navigation system, a carrying-type game machine, a home-use game machine, a carrying-type music player, a handy terminal, a gadget (electronic equipment), an Interactive TV, a digital tuner, a digital recorder, data home electronics (data home appliance), OA (Office Automation) equipment and so on. Also, the user terminal 10 may be installed in a moving body such as a vehicle, a ship, and an aircraft.

As an example of the switch 20 (20-i, i=1 to n), a network switch, a router, a proxy, a gateway, a firewall, a load balancer (load distribution apparatus), a band control apparatus (packet shaper), a security monitor and control equipment (SCADA: Supervisory Control And Data Acquisition), a gatekeeper, a base station, an access point (AP: Access Point), a communication satellite (CS) or a computer which has a plurality of communication ports and so on are exemplified. Also, the switch 20 (20-i, i=1 to n) may be a virtual switch.

Although not shown, each of the user terminal 10, the switch 20 (20-i, i=1 to n), the controller 30 and the server 40 is realized by a processor which drives based on a program to execute predetermined processes, a memory which stores the program and data of all kinds, and a communication interface for connection with the network.

As an example of the above-mentioned processor, a CPU (Central Processing Unit), a microprocessor, a microcontroller, a semiconductor integrated circuit (IC: Integrated Circuit) which has a function of an exclusive use and so on are exemplified.

As an example of the above-mentioned memory, RAM (Random Access Memory), ROM (Read Only Memory), and semiconductor memory devices such as EEPROM (Electrically Erasable and Programmable Read Only Memory) and a flash memory, auxiliary storages such as an HDD (Hard Disk Drive) and an SSD (Solid State Drive), or removable disks such as DVD (Digital Versatile Disk), storage media such as SD memory card (Secure Digital memory card) and so on are exemplified.

Incidentally, the above-mentioned processor and the above-mentioned memory may be united. For example, in recent years, a 1-chip device such as a microcomputer has been developed. Therefore, a case that the 1-chip microcomputer installed in the electronic equipment and so on is composed of the processor and the memory is considered.

As an example of the above-mentioned communication interface, substrates (such as a motherboard, and an I/O board) corresponding to the network communication and so on and semiconductor integrated circuits such as the chip, network adapters such as NIC (Network Interface Card) and similar expansion cards, communication units such as an antenna, communication ports such as a connection mouths (a connector) and so on are exemplified.

Also, as an example of the network, the Internet, a LAN (Local Area Network), a wireless LAN (Wireless LAN), a WAN (Wide Area Network), a backbone, a CATV line, a fixed telephone network, a mobile phone network, WiMAX (IEEE 802.16a), 3G (3rd Generation), a dedicated line (lease line), IrDA (Infrared Data Association), Bluetooth (registered trademark), a serial communication line, a data bus and so on are exemplified.

The structural elements of each of the user terminal 10, the switches 20 (20-i, i=1 to n), the controller 30 and the server 40 may be a module, a component, an exclusive use device and start-up (call) programs.

However, the present invention is actually not limited to these examples.

(Detailed Configuration of Controller)

The controller 30 is provided with a user data storage section 31, a QoS policy storage section 32, a topology data storage section 33, a flow table storage section 34, a user authenticating section 35, a QoS control section 36, a route calculating section (a route control section) 37, a flow table generating section 38 and a switch control section 39.

The user data storage section 31 stores user data previously (preliminary). The user data contains a "user name", a "password", a "QoS policy" and so on as shown in FIG. 2. It should be noted that "the user name" and "the password" are an example of authentication data only.

The QoS policy storage section 32 stores a QoS policy correspondence table. The QoS policy correspondence table is represented as a correspondence of an "IP address" of the user authenticated and the "QoS policy" as shown in FIG. 3.

The topology data storage section 33 stores topology data (connection status of the network) previously. The topology data is represented as a set of "switch identifiers" and "port names" of two switches connected at the both ends of a link and a "band width" of the link as shown in FIG. 4.

The flow table storage section 34 stores a flow table registered on the switches 20 (20-i, i=1 to n) and the entries. As shown in FIG. 5, the flow entry of the flow table is represented with header data of the packet ("a source IP address", "a destination IP address", "a protocol", "a TCP/UDP source port number", "a TCP/UDP destination port number", "a DSCP value"), "a transmission port" showing an action, "a transmission queue" of the port, and "a DSCP value" used for rewrite.

Generally, "the DSCP (Differentiated Services Code Point) value" is a combination of an "IP Priority" field and a "type of service" field.

The user authenticating section 35 requests authentication data (a user name, a password and so on) when connecting the user terminal 10, and searches the user data storage section 31 based on the request result to allocate the QoS policy.

The QoS control section 36 relates the QoS policy allocated by the user authenticating section 35 and the IP address of the user terminal 10 to each other and stores them in the QoS policy storage section 32.

The route calculating section 37 searches the topology data storage section 33, and determines a route based on the QoS policy, such that the flow with a high priority passes through an IP network 41 with a high contract band, for example.

The flow table generating section 38 generates the flow table of the switch 20 (20-i, i=1 to n) on the route to an inputted flow, the route, and the QoS policy, and stores a registration status in the flow table storage section 34.

Switch control section 39 communicates with the switch 20 (20-i, i=1 to n) and carries out the reception of the notice from the switch 20 (20-i, i=1 to n) and the registration of the flow table to the switch 20 (20-i, i=1 to n).

(QoS Control Processing)

Figure 6:
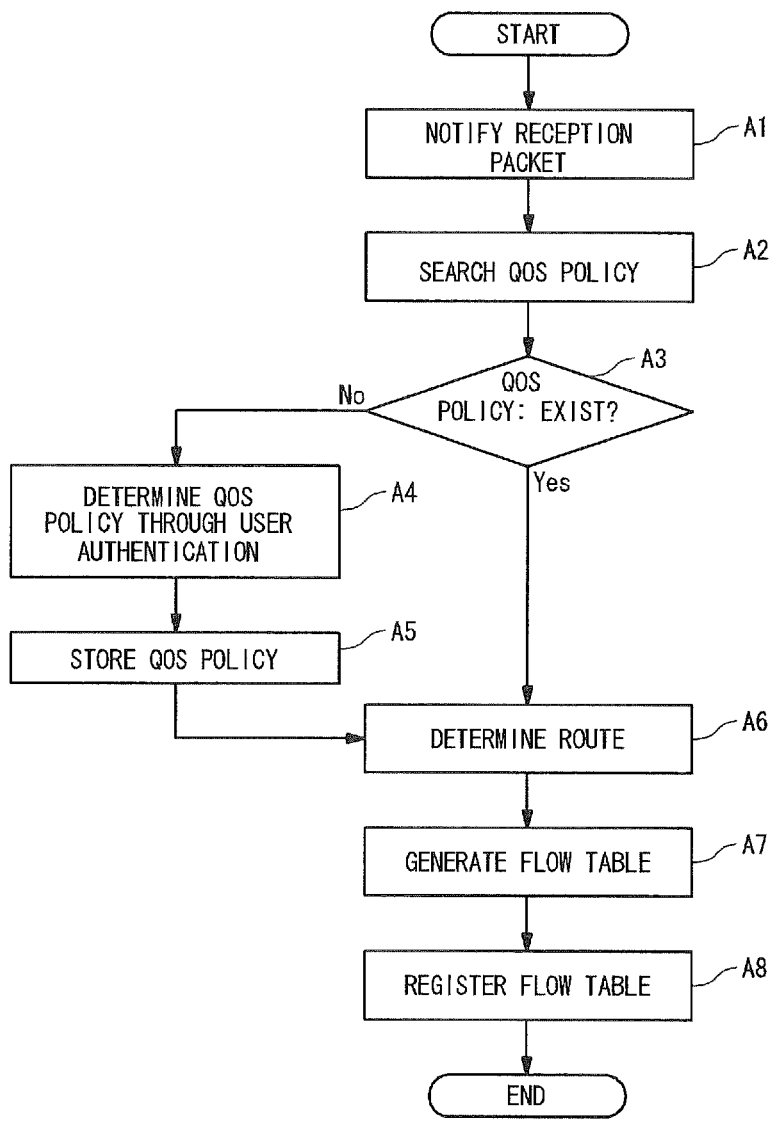
FIG. 6 is a flow chart showing a QoS control method in the first exemplary embodiment.

Next, the QoS control in the present exemplary embodiment will be described in detail with reference to FIG. 6.

(1) Step A1

When being connected with the network, the user terminal 10 transmits a packet. When receiving the packet, the switch 20 (20-i, i=1 to n) searches the flow table storage section 34 by using the header data of the reception packet as a key. If any corresponding flow entry is not registered in the flow table, the switch notifies the reception packet to the switch control section 39 of the controller 30.

(2) Step A2

When receiving the notice, the switch control section 39 transfers the packet to the QoS control section 36. The QoS control section 36 retains the packet and searches the QoS policy storage section 32 as a key the source IP address.

(3) Step A3

The QoS control section 36 searches the QoS policy storage section 32 to confirm whether or not the corresponding IP address exists. When the corresponding IP address exists as the search result of the QoS policy storage section 32, the QoS control section 36 specifies the QoS policy corresponding to the IP address and transfers the retained packet to the route calculating section 37. Also, when the corresponding IP address does not exist as the search result of the QoS policy storage section 32, the QoS control section 36 notifies to user authenticating section 35 because of the non-authentication of the user.

(4) Step A4

The user authenticating section 35 requests the authentication data (the user name, the password and so on) to the user terminal 10, carries out authentication based on the request result, searches the user data storage section 31, and determines the QoS policy to notify to the QoS control section 36.

(5) Step A5

The QoS control section 36 relates the inputted QoS policy and the source IP address of the retained packet to each other, records them to the QoS policy storage section 32, and transfers the retained packet and the QoS policy to the route calculating section 37.

(6) Step A6

The route calculating section 37 searches the topology data storage section 33 based on the inputted packet and the QoS policy, determines a route such that the flow with a high priority passes through an IP network 41 with a high contract band, for example, and notifies a packet, the QoS policy and route data to the flow table generating section 38.

(7) Step A7

The flow table generating section 38 determines the header data, the transmission port, the transmission queue, and the DSCP value for rewrite in the flow table of the switches 20 (20-$i$, i=1 to n) into the transmission direction to the networks A and B from the inputted packet, the QoS policy and the route data.

Also, the flow table generating section 38 determines the transmission queue in the flow table of the switch 20 (20-$i$, i=1 to n) into the reception direction from the networks A and B from the DSCP value.

A specific instance of the flow table is as shown in FIG. 5.

In this way, the flow table generating section 38 generates the flow tables of the switch 20-1 and the switch 20-2 for the round-trip to transfer the switch control section 39.

(8) Step A8

The switch control section 39 registers the inputted flow tables on the respective switches 20 (20-$i$, i=1 to n) on the route.

Since then, each of the switches 20 (20-$i$, i=1 to n) on the route carries out a transfer according to the flow entry of the registered flow table. When receiving the packet, each of the switches 20 (20-$i$, i=1 to n) refers to the corresponding flow entry to transmit the packet from the port determined based on the route.

The QoS control is carried out by "DiffServ" by referring to the DSCP value between the switches 20 (20-$i$, i=1 to n) which sandwich the networks A and B.

(Effect of the Present Exemplary Embodiment)

In the present exemplary embodiment, because it is possible to determine the route by the controller to pass through the network corresponding to the QoS policy of the user, the QoS control can be carried out in the user unit, even if a plurality of external networks exist in the communication route.

Also, in the present exemplary embodiment, it is possible to identify the flow of the authenticated user to carry out a marking of the DSCP value, and to refer to the DSCP value in the external network to carry out the QoS control. Therefore, the QoS control can be carried out in the user unit, even when the external network provides the QoS by "DiffServ".

Second Exemplary Embodiment

Below, a second exemplary embodiment of the present invention will be described.

The second exemplary embodiment is different from the first exemplary embodiment in that the user authentication is carried out by the external general authentication server to determine the QoS policy depends. The attribute of the QoS is not defined in the general authentication server, but there is an attribute peculiar to a vender and the QoS policy can been contained in the attribute. For example, VSA (Vendor Specific Attribute) is prepared in RADIUS (Remote Authentication Dial In User Service), and can be used as the attribute of the user.

Figure 7:
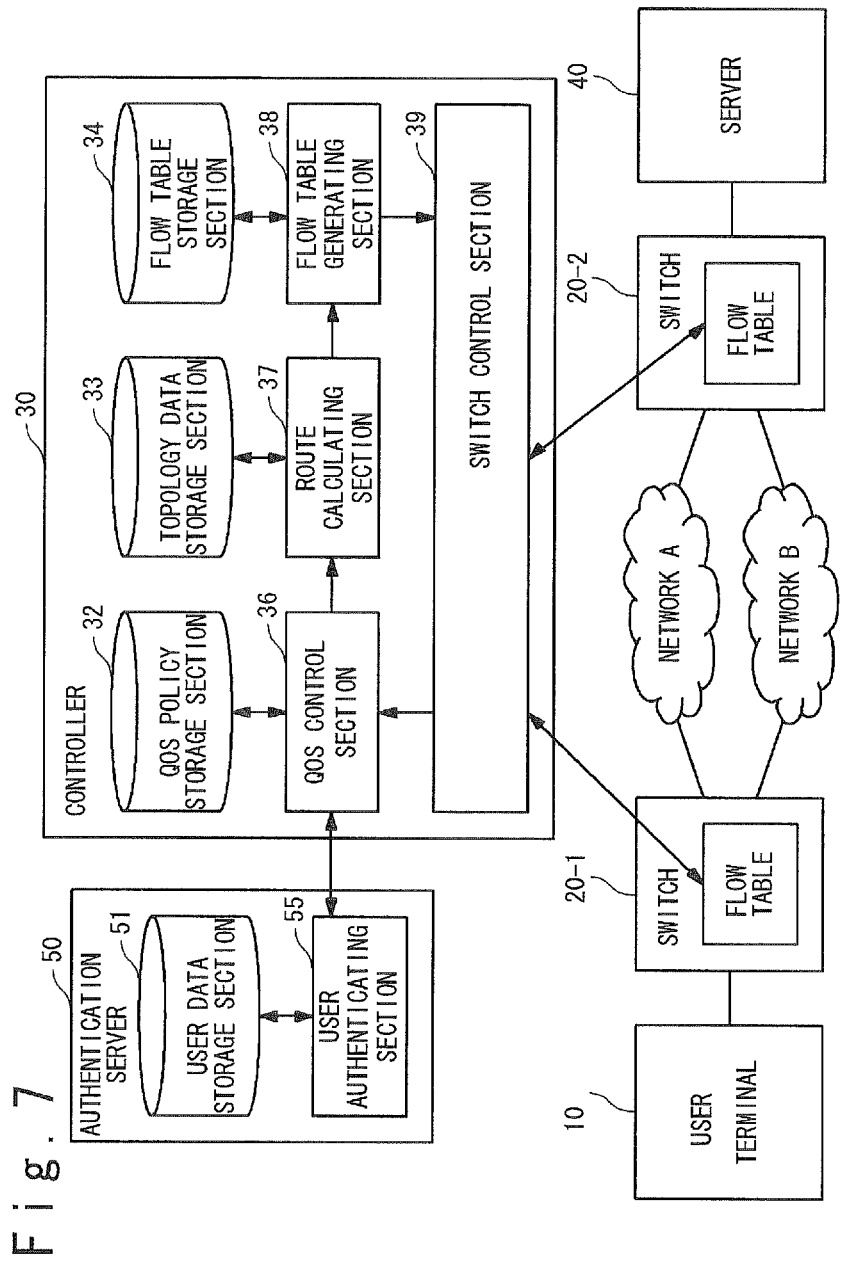
FIG. 7 is a diagram showing a configuration example of the network system according to a second exemplary embodiment of the present invention.

Referring to FIG. 7, the network system of the present exemplary embodiment contains the user terminal 10, the switch 20 (20-$i$, i=1 to n:n are the number of the switches), the controller 30, the server 40 and authentication the server 50.

The user terminal 10, the switch 20 (20-$i$, i=1 to n), the controller 30, and the server 40, it are basically the same as those of the first exemplary embodiment shown in FIG. 1.

In the present exemplary embodiment, a function of the user authentication in the controller 30 of the first exemplary embodiment is separated to be independent as an authentication server 50.

(Detailed Configuration of the Controller)

The controller 30 is provided with the QoS policy storage section 32, the topology data storage section 33, the flow table storage section 34, the QoS control section 36, the route calculating section 37, the flow table generating section 38 and the switch control section 39.

The QoS policy storage section 32, the topology data storage section 33, the flow table storage section 34, the QoS control section 36, the route calculating section 37, the flow table generating section 38, and the switch control section 39 are basically the same as those of the first exemplary embodiment shown in FIG. 1.

(Detailed Configuration of the Authentication Server)

The authentication server 50 is provided with a user data storage section 51 and a user authenticating section 55.

The user data storage section 51 is basically the same as the user data storage section 31 of the first exemplary embodiment shown in FIG. 1. That is, the user data storage section 51 stores the user data previously. The user data contains "a user name", "a password", "a QoS policy" and so on, as shown in FIG. 2.

The user authenticating section 55 is basically the same as the user authenticating section 35 of the first exemplary embodiment shown in FIG. 1. That is, the user authenticating section 55 requests the authentication data (the user name, the password and so on) when connecting to the user terminal 10, and searches the user data storage section 51 based on the request result and allocates the QoS policy.

(QoS Control Processing)

Figure 8:
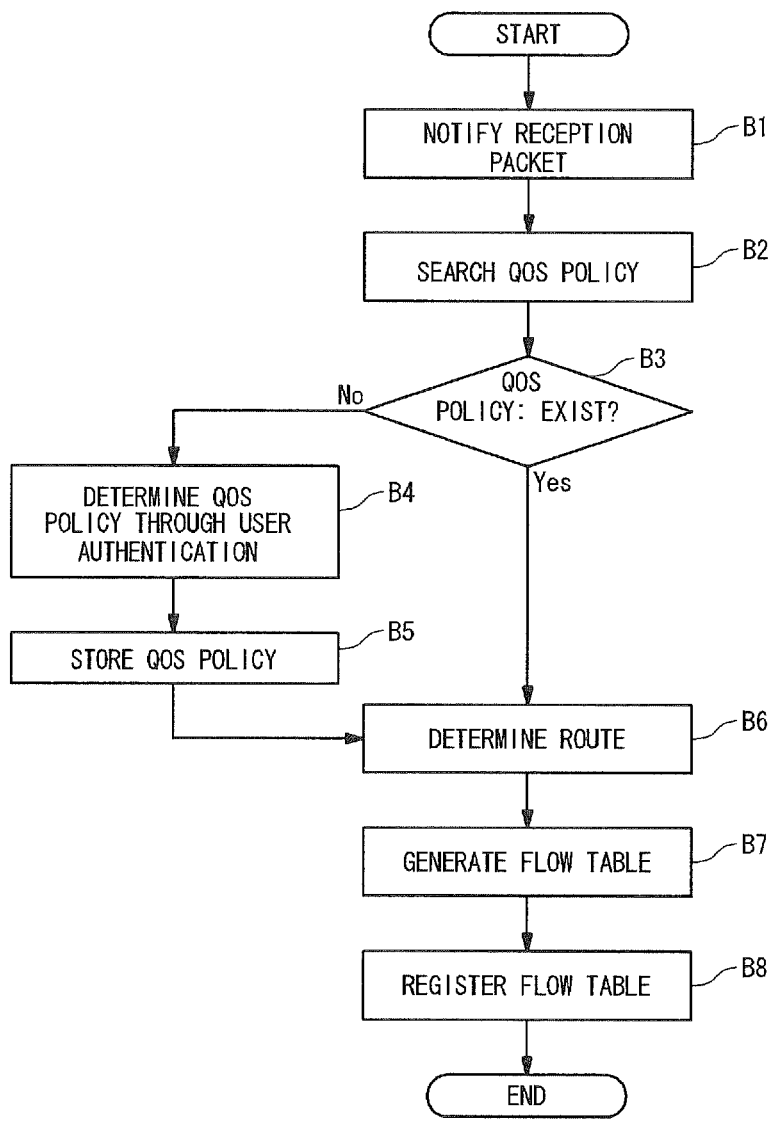
FIG. 8 is a flow chart showing the QoS control method in the second exemplary embodiment.

The QoS control processing of the present exemplary embodiment will be described in detail with reference to FIG. 8.

(1) Step B1

When the user terminal 10 is connected with the network, the user terminal transmits a packet. The switch 20 (20-$i$, i=1 to n) searches the flow table storage section 34 by using the header data of the reception packet as a key when receiving the packet. If the flow entry corresponding to the flow table is not registered, the switch notifies the received packet to the switch control section 39 of the controller 30.

(2) Step B2

When receiving the notice, the switch control section 39 transfers the packet to the QoS control section 36. The QoS control section 36 retains the received packet and searches the QoS policy storage section 32 by using the source IP address as the key.

(3) Step B3

The QoS control section 36 confirms whether or not a corresponding IP address exists through the search of the QoS policy storage section 32. When the corresponding IP address exists as the result of the search of the QoS policy storage section 32, the QoS control section 36 specifies the QoS policy corresponding to the IP address, and transfers the retained packet to the route calculating section 37. Also, when the corresponding IP address does not exist as the result of the search of the QoS policy storage section 32, the QoS control section 36 notifies to the user authenticating section 55 of authentication server 50, because of the non-authentication of the user.

(4) Step B4

The user authenticating section 55 requests authentication data (the user name, the password and so on) to the user terminal 10, carries out the authentication based on a reply to the request, searches the user data storage section 51, and determines the QoS policy based on the vender peculiar attribute to notify to the QoS control section 36 of the controller 30.

(5) Step B5

The QoS control section 36 registers a relation of the QoS policy and the source IP address of the retained packet in the QoS policy storage section 32 and transfers the retained packet and the QoS policy to the route calculating section 37.

(6) Step B6

The route calculating section 37 searches the topology data storage section 33 based on the inputted packet and the QoS policy, determines a route such that a flow with a high priority passes through an IP network 41 with a high contract band width, for example, and notifies the packet, the QoS policy, and the route data to the flow table generating section 38.

(7) Step B7

The flow table generating section 38 determines the header data, the transmission port, the transmission queue, and the DSCP value for rewrite in the flow table of the switch 20 (20-$i$, i=1 to n) in the transmission direction to the networks A and B based on the inputted packet, the QoS policy and the route data.

Also, the flow table generating section 38 determines the transmission queue in the flow table of the switch 20 (20-$i$, i=1 to n) in the reception direction from the networks A and B based on the DSCP value.

A specific instance of the flow table is as shown in FIG. 5.

In this way, the flow table generating section 38 generates the flow tables of the switch 20-1 and the switch 20-2 for round-trip to transfer to the switch control section 39.

(8) Step B8

The switch control section 39 registers the flow tables on the respective switches 20 (20-$i$, i=1 to n) on the route.

Since then, each of the switches 20 (20-$i$, i=1 to n) on the route carries out the transfer according to the flow entry of the registered flow table. When receiving the packet, each of the switches 20 (20-$i$, i=1 to n) refers to the corresponding flow entry to transmit the packet from the port determined according to the route.

The QoS control is carried out between the switches 20 (20-$i$, i=1 to n) which sandwiches the networks A and B by "DiffServ" by referring to the DSCP value.

Other Exemplary Embodiments

The user data 31 and the user authenticating section 35 are separated from the controller 30 to be independent as the authentication server 50 in the second exemplary embodiment of the present invention. Actually, it is possible to separate the other components from the controller 30 to be independent as an external server. For example, the QoS policy storage section 32 and the QoS control section 36 may be separated to be independent as the QoS server, and the topology data storage section 33 and the route calculating section 37 may be separated to be independent as the path control server.

<Relation Among Exemplary Embodiments>

It should be noted that the above-mentioned exemplary embodiments can be combined. For example, when there is no corresponding data in its own user data 31 and user authenticating section 35, the controller 30 of the first exemplary embodiment may inquire to the authentication server 50 of the second exemplary embodiment. Also, it is possible to substitute the controller 30 and the authentication server 50 of the second exemplary embodiment for the controller 30 of the first exemplary embodiment.

<Summary>

As described above, in the present invention, when communicating from the user terminal to the server is carried out, the switch receives the first packet, and issues a notice to the external controller, and the user authenticating section of the controller determines the QoS policy of the flow to the user.

When the plurality of networks A and B exist on the route, the route calculating section selects the route from the QoS policy and the topology data of the topology data storage section so as to pass through an appropriate IP network.

In case to transmit the packet to the selected IP network, the flow table generating section generates the flow table which carries out a marking of DSCP value to the DS (DiffServ) field of the IP header and the queuing based on the QoS policy and registers the flow table for the round-trip on the switch.

Since then, the switch carries out the packet transfer according to the QoS of the registered flow table, and the QoS control by "DiffServ" is carried out by referring to the DSCP value of the DS field of the IP header in networks A and B.

In the present invention, user authentication is carried out when the user terminal is connected to the network, and the communication can be made possible according to the QoS policy.

Also, by carrying out the control of the switch by the external controller, identifying the packet of the user and to make a marking, and select a communication route so as to pass through the appropriate network, the QoS control can be carried out in a user unit, when the external network exists on the communication route.

<Supplemental Notes>

Part or all of the above-mentioned exemplary embodiments can be described in the following manner. The present invention is not limited to the following specified examples.

(Supplemental Note 1)

A network system includes a switch connected with a plurality of external networks and having a function of searching a flow entry defined with a rule and an action to uniformly control packets of a flow and carrying out the action defined in the entry to the reception packet corresponding to the rule defined in the entry; and a controller having a function of receiving an inquiry of the packet from the switch and registering the entry defined with the rule and the action to uniformly control the packet, to the flow table of the switch, wherein the controller includes a QoS control section having a function of specifying a QoS policy corresponding to the packet, the inquiry of which is received from the switch;

a route calculating section having a function of selecting an external network corresponding to the QoS policy based on the QoS policy and topology data showing a connection status of a network and calculating an optimal route;

a flow table generating section having a function of determining a transmission port and a transmission queue of the switch on the route from the packet, route data and the QoS policy, and generating the entry of the flow table; and a switch control section having a function of registering the entry to the flow table of the switch on the route.

(Supplemental Note 2)

The network system according to supplemental note 1, wherein the flow table generating section has a function of determining a DSCP value for rewriting header data defined as the rule in the entry of the flow table in a transmission direction, and a transmission port and a transmission queue which are defined as the action in the entry, and a function of determining the transmission queue defined as the action in the entry of the flow table in a reception direction from the DSCP value.

(Supplemental Note 3)

The network system according to supplemental notes 1 or 2, wherein the controller further includes a user authenticating section having a function of requesting authentication data (a user name, a password and so on) to a transmission source of the packet, when a QoS policy corresponding to the packet does not exist, and determining the QoS policy to the transmission source of the packet based on a reply result to the request.

(Supplemental Note 4)

The network system according to any of supplemental notes 1 to 3, further includes an authentication server connected with the controller, wherein the authentication server includes a user authenticating section having a function of requesting authentication data (a user name, a password and so on) to the transmission source of the packet, when the QoS policy corresponding to the packet does not exist, and determining the QoS policy to the transmission source of the packet based on a reply result to the request.

(Supplemental Note 5)

A controller includes:

a QoS control section having a function of specifying a QoS policy corresponding to a packet, an inquiry of which is received from a switch connected with a plurality of external networks; a route calculating section having a function of selecting an external network corresponding to the QoS policy based on a QoS policy and topology data showing a connection status of a network and calculating an optimal route;

a flow table generating section having a function of determining a transmission port and a transmission queue of the switch on a route from the packet, route data and the QoS policy and generating an entry of a flow table; and a switch control section having a function of registering the entry to the flow table of the switch on the route.

REMARKS

Although the exemplary embodiments have been described in detail, the present invention is not limited to the above-mentioned exemplary embodiments, and any modification not apart from the scope of the present invention is contained in the present invention.

It should be noted that the present invention claims a priority on convention based on Japanese Patent Application No. JP 2011-009720. The disclosure thereof is incorporated herein by reference.

The invention claimed is:

1. A Network system comprising:

a switch connected with a plurality of external networks, and configured to execute processing of a reception packet based on an entry of a preregistered flow table; and a controller configured to register the entry defined with a rule and an action to control packets of a flow by said switch, to the flow table of said switch, wherein said controller classifies flows, carries out user authentication to a transmission source of the packet based on the packet when receiving an inquiry of a packet from said switch, determines a Quality of Service (QoS) class based on a result of the user authentication, determines a communication route so as to pass through an external network corresponding to the QoS class of the transmission source based on a connection status of the network and a band width of the network, generates the entry defined with the rule and the action to uniformly control of the packets of the flow by said switch based on a QoS policy, and registers the entry to the flow table of said switch;

wherein said controller comprises:

means for specifying the QoS policy corresponding to the packet, the inquiry of which is received from said switch;

means for selecting the external network corresponding to the QoS policy based on the QoS policy and a topology data showing the connection status of the network, and calculating an optimal route;

means for determining a transmission port and a transmission queue of said switch on the route from the packet, data of the route, and the QoS policy, and generating the entry of the flow table; and means for registering the entry to the flow table of said switch on the route.

2. The network system according to claim 1, wherein said controller further comprises:

means for identifying the flow of the transmission source authenticated, determining the transmission port, the transmission queue, and a masked Differentiated Services Code Point (DSCP) value in said switch on the route for every flow, and generating the entry of the flow table.

3. The network system according to claim 2, wherein said controller further comprises:

means for determining the DSCP value for rewriting header data defined as the rule in the entry of the flow table in a transmission direction, and the transmission port and the transmission queue which are defined as an action in the entry; and means for determining the transmission queue defined as the action in the entry of the flow table in a reception direction, from the DSCP value.

4. The network system according to claim 1, wherein said controller further comprises:

means for requesting authentication data to the transmission source of the packet when the QoS policy corresponding to the packet does not exist; and means for determining the QoS policy to the transmission source of the packet based on a reply result to the request.

5. The network system according to claim 1, further comprising an authentication server connected with said controller,
wherein said authentication server requests authentication data to the transmission source of the packet, when the QoS policy corresponding to the packet, the inquiry of which is received from said controller, does not exist, determines the QoS policy to the transmission source of the packet based on a reply result to the request, and issues a notice to said controller.

6. A controller comprising:
a user authenticating section configured to carry out user authentication to a transmission source of a packet based on the packet in case of reception of an inquiry of the packet from a switch which executes processing of a reception packet based on an entry of a preregistered flow table, of switches connected with a plurality of external networks;
a Quality of Service (QoS) control section configured to determine a QoS class based on a result of the user authentication;
a route calculating section configured to determine a communication route so as to pass through an external network corresponding to the QoS class of the authenticated transmission source based on a connection status of a network and a band width of the network;
a flow table generating section configured to generate an entry defined with a rule and an action to control packets of a flow by said switch based on a QoS policy; and
a switch control section configured to set the entry to the flow table of said switch;
wherein said QoS control section specifies the QoS policy corresponding to the packet, the inquiry of which is received from said switch,
wherein said route calculating section selects an external network corresponding to the QoS policy based on the QoS policy and topology data showing the connection status of a network and calculates an optimal route,
wherein said flow table generating section determines a transmission port and a transmission queue of said switch on a route based on the packet, the route data and the QoS policy, and generates the entry of the flow table, and
wherein said switch control section registers the entry to the flow table of said switch on the route.

7. The controller according to claim 6, wherein said flow table generating section identifies a flow of an authenticated transmission source and determines the transmission port, the transmission queue and a marked Differentiated Services Code Point (DSCP) value in said switch on the route for every flow.

8. The controller according to claim 7, wherein said flow table generating section determines a DSCP value to rewrite header data defined as the rule in the entry of the flow table in a transmission direction, the transmission port and the transmission queue which are defined as an operation in the entry, and determines the transmission queue defined as the operation in the entry of the flow table to a reception direction based on the DSCP value.

9. A Quality of Service (QoS) control method executed by a controller, comprising:

carrying out user authentication to a transmission source of a packet based on a packet in case of reception of an inquiry of the packet from a switch which executes processing of a reception packet based on an entry of a flow table previously registered, of switches connected with a plurality of external networks;
determining a QoS class based on a result of the user authentication;
determining a communication route so as to pass through an external network corresponding to the QoS class of the authenticated transmission source based on a connection status of a network and a band width of a network;
generating an entry defined with a rule and an action to control packets of the flow by said switch based on the determined communication route; and
registering said entry to the flow table of said switch;
wherein said determining said QoS class comprises:
specifying the QoS policy corresponding to the packet, the inquiry of which is received from said switch;
selecting the external network corresponding to the QoS policy based on the QoS policy and a topology data showing the connection status of the network, and calculating an optimal route;
determining a transmission port and a transmission queue of said switch on the route from the packet, data of the route, and the QoS policy, and generating the entry of the flow table; and
registering the entry to the flow table of said switch on the route.

10. A non-transient recording medium in which a program is stored to make a computer execute:
carrying out user authentication to a transmission source of a packet based on the packet in case of reception an inquiry of the packet from a switch which executes processing of a reception packet based on an entry of a pre-registered flow table, of switches connected with a plurality of external networks;
determining a Quality of Service (QoS) class based on a result of the user authentication;
determining a communication route so as to pass through an external network corresponding to the QoS class of the authenticated transmission source based on a connection status of a network and a band width of the network;
generating an entry defined with a rule and an action to control packets of a flow by said switch based on a QoS policy; and
registering the entry to the flow table of said switch;
wherein said determining said QoS class comprises:
specifying the QoS policy corresponding to the packet, the inquiry of which is received from said switch;
selecting the external network corresponding to the QoS policy based on the QoS policy and a topology data showing the connection status of the network, and calculating an optimal route;
determining a transmission port and a transmission queue of said switch on the route from the packet, data of the route, and the QoS policy, and generating the entry of the flow table; and
registering the entry to the flow table of said switch on the route.

* * * * *